(12) United States Patent
Hossfeld et al.

(10) Patent No.: US 7,965,430 B2
(45) Date of Patent: Jun. 21, 2011

(54) PRE-EXPOSURE AND CURING OF PHOTO-SENSITIVE MATERIAL FOR OPTICAL DATA STORAGE

(75) Inventors: Wolfgang Hossfeld, Villingen-Schwenningen (DE); Frank Przygodda, Villingen-Schwenningen (DE)

(73) Assignee: Thomson Licensing, Boulogne-Billancourt (FR)

(*) Notice: Subject to any disclaimer, the term of this patent is extended or adjusted under 35 U.S.C. 154(b) by 437 days.

(21) Appl. No.: 11/986,003

(22) Filed: Nov. 19, 2007

(65) Prior Publication Data
US 2008/0145764 A1 Jun. 19, 2008

(30) Foreign Application Priority Data
Dec. 13, 2006 (EP) .................................. 06126033

(51) Int. Cl.
*G03H 1/26* (2006.01)
*G11B 7/00* (2006.01)

(52) U.S. Cl. .......................................... 359/22; 369/103
(58) Field of Classification Search ............... 359/1, 21, 359/35, 22; 369/103
See application file for complete search history.

(56) References Cited

U.S. PATENT DOCUMENTS

| 3,934,461 | A | 1/1976 | Heflinger et al. | |
| 6,154,432 | A | 11/2000 | Faruqi et al. | |
| 6,526,194 | B1 | 2/2003 | Laor | |
| 7,187,481 | B1* | 3/2007 | Sigel et al. | 359/28 |
| 7,626,913 | B2 | 12/2009 | Usami | |
| 2002/0071145 | A1 | 6/2002 | Roh | |
| 2006/0050341 | A1* | 3/2006 | Horimai | 359/22 |

FOREIGN PATENT DOCUMENTS

| EP | 1111603 A1 | 6/2001 |
| EP | 1708180 A2 | 10/2006 |

OTHER PUBLICATIONS

Search report dated May 21, 2007.

* cited by examiner

*Primary Examiner* — Alessandro Amari
(74) *Attorney, Agent, or Firm* — Robert D. Shedd; Jeffrey M. Navon

(57) ABSTRACT

The present invention relates to an apparatus for writing to optical storage media capable of performing pre-exposure and/or curing of a photo-sensitive material for optical data storage, in particular for holographic data storage.

The apparatus has a first light source for emitting a first light beam, a second light source for emitting a second light beam, and a spatial light modulator, which is switchable between at least two states for spatially modulating at least a part of the first light beam, and which is arranged such that in a first state it directs the first light beam towards an optical storage medium, and that in a second state it directs the second light beam towards the optical storage medium.

7 Claims, 2 Drawing Sheets

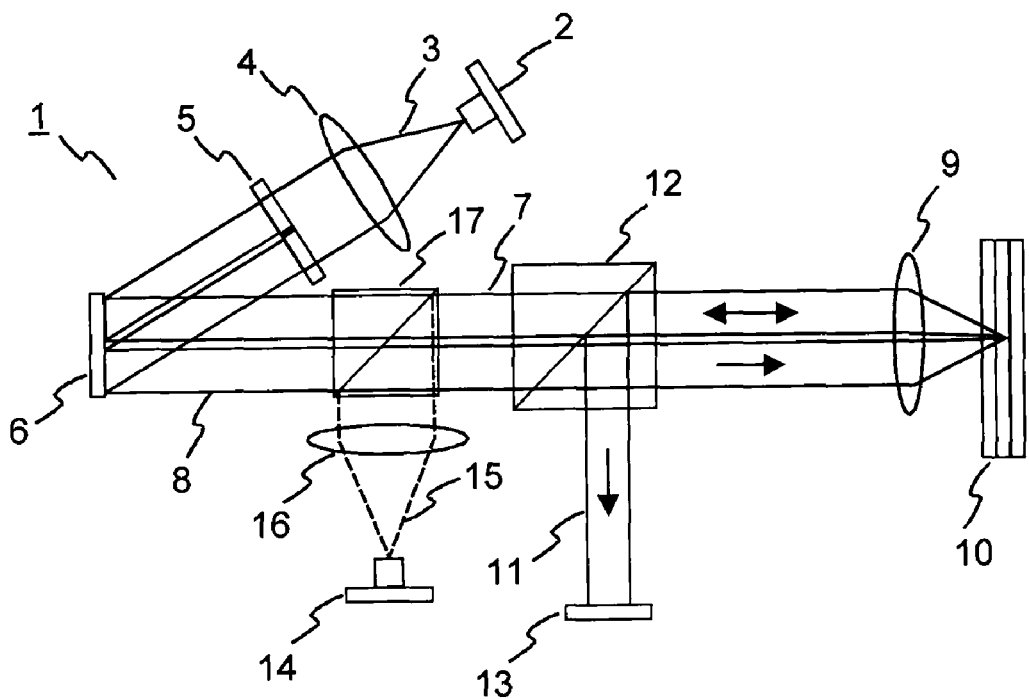
Fig. 1 - Prior Art
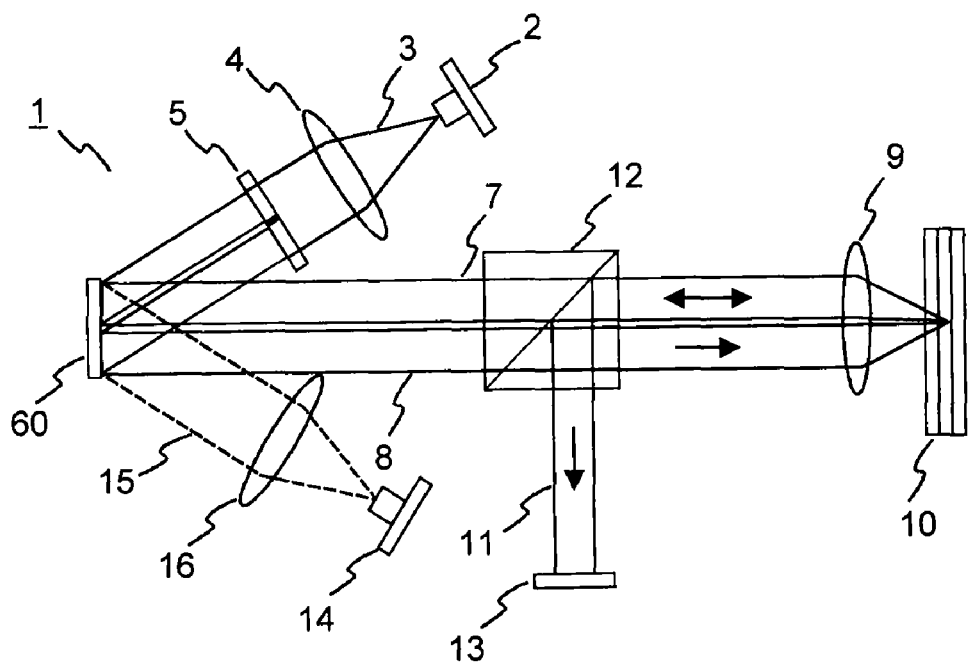
Fig. 2

PRE-EXPOSURE AND CURING OF PHOTO-SENSITIVE MATERIAL FOR OPTICAL DATA STORAGE

This application claims the benefit, under 35 U.S.C. §119, of EP Application No. 06126033.7 on 13 Dec. 2006.

FIELD OF THE INVENTION

The present invention relates to an apparatus for writing to optical storage media capable of performing pre-exposure and/or curing of a photo-sensitive material for optical data storage, in particular for holographic data storage.

BACKGROUND OF THE INVENTION

One concept for increasing the capacity of optical storage media is to use holographic data storage. In this case the whole volume of the holographic storage medium is used for storing information, not just a few layers as for conventional optical storage media. In holographic data storage digital data are stored by recording the interference pattern produced by the superposition of two coherent laser beams, where one beam is modulated by a spatial light modulator and carries the information to be recorded in the form of data pages.

For holographic data storage, but also for other types of optical data storage, photo-sensitive materials such as photo-polymers are used for optical data recording. These materials change specific physical properties, e.g. the refractive index, in dependence on the total light energy that is locally absorbed by the material. These changes allow to record data within the material. For some materials it is necessary to pre-expose the material before data can be efficiently recorded, and to expose the material again after recording data. This last exposure or post-exposure is also known as curing, fixing or flood curing. Pre-exposure is necessary to increase the sensitivity of the material, which is needed for achieving a high recording data rate. Curing is necessary to process all unprocessed material after recording, i.e. the recorded data is fixed and the recording of additional data in the material is prevented. It is desirable that pre-exposure and curing do not lead to any detectable data structure in the material. The aim of pre-exposure is to raise the sensitivity of the material before storing data. The aim of curing is to lower the sensitivity of the material after recording data. For both pre-exposure and curing the volume of the photo-sensitive material where data is to be or has been recorded needs to be exposed to light in such a way that the resulting changes of the physical properties do not disturb the data recording quality. Usually this is achieved by exposing the material to incoherent light, which is emitted, for example, by an array of LEDs. In this way a homogeneous change of the physical properties is obtained throughout the recording volume. Using incoherent light sources an inhomogeneous exposure of the material, caused for example by interference effects, is avoided.

For example, U.S. Pat. Nos. 4,799,746 and 4,687,720 disclose methods for curing a photo-sensitive material used for holographic data storage. In both cases a coherent light source like a laser diode is used for optical data recording. An additional source of incoherent light is used for curing. As a consequence two at least partially separate optical paths and two separate electronic drivers to control the light sources are needed. This complicates the optical system and raises its cost.

SUMMARY OF THE INVENTION

It is an object of the invention to propose an apparatus for writing to optical storage media having a simplified arrangement for pre-exposure and/or curing of an optical storage medium.

According to the invention, this object is achieved by an apparatus for reading from and/or writing to optical storage media, with a first light source for emitting a first light beam, a second light source for emitting a second light beam, and a spatial light modulator, which is switchable between at least two states for modulating at least a part of the first light beam, and which is arranged such that in a first state it directs the first light beam towards an optical storage medium, and that in a second state it directs the second light beam towards the optical storage medium.

The invention proposes to use a spatial light modulator (SLM) in such a way that it can steer either of the light beams into the main optical path of the apparatus. Thus a single element is sufficient to selectively steer the light of both light sources into the optical path. This simplifies the optical setup and reduces the number of components. For directing the second light beam towards the optical storage medium the spatial light modulator is switched from the first state, in which it modulates at least a part of the first light beam, into the second state. The second light source is then switched on for emitting the second light beam. Of course, the second light source may likewise be switched on before switching the spatial light modulator into the second state.

A further advantage of the solution according to the invention is that pre-exposure and/or curing can be performed with a spatially varying exposure dose. The exposure dose is defined as the product of the exposure intensity and the exposure time. By selectively switching only some of the pixels of the SLM into the second state, and/or by individually adapting the time during which the pixels remain in the second state, a desired exposure dose profile is generated.

Advantageously, the spatial light modulator is a digital mirror device having a plurality of switchable micro mirrors. The digital mirror device has the advantage that the two different states can easily be realized by tilting the micro mirrors in two different directions, e.g. by +30° and −30°. By using further discrete tilting angles additional states can be realized, e.g. for selectively directing more than two light beams towards the optical storage medium.

Preferably, the optical storage medium is a holographic storage medium. For holographic storage media two light beams are needed, a coherent light beam for writing to the holographic storage medium and an incoherent light beam for pre-exposure and/or curing of the holographic storage medium. The solution according to the invention hence allows to simplify the layout of the pickup of a holographic storage system and to reduce the manufacturing cost.

BRIEF DESCRIPTION OF THE DRAWINGS

For a better understanding the invention shall now be explained in more detail in the following description with reference to the figures. In the exemplary embodiment, the invention is applied to a holographic storage medium. It is understood that the invention is also applicable to other types of optical storage media and that specified features can also expediently be combined and/or modified without departing from the scope of the present invention. In the figures:

FIG. 1 schematically depicts a prior art apparatus for reading from and writing to holographic storage media, FIG. 2 schematically depicts an apparatus according to the invention for reading from and writing to holographic storage media.

DETAILED DESCRIPTION OF PREFERRED EMBODIMENTS

Figure 3:
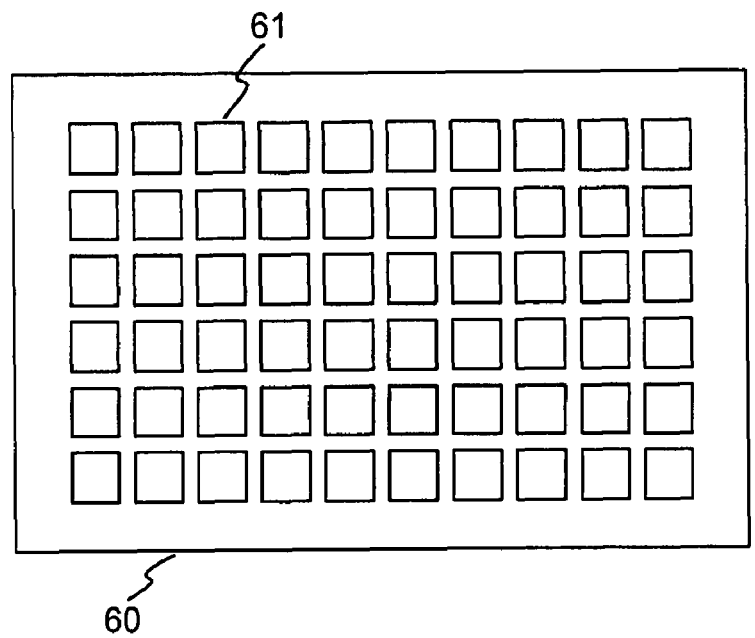
FIG. 3 shows a top view of a digital mirror device of the apparatus of FIG. 2.

In holographic data storage digital data are stored by recording the interference pattern produced by the superposition of two coherent laser beams. An exemplary setup of a prior art apparatus 1 for reading from and writing to holographic storage media is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A reflective spatial light modulator (SLM) 6 modulates one of the two beams, the so called "object beam" 7, to imprint a 2-dimensional data pattern. In addition, the reflective spatial light modulator 6 reflects the further beam, the so called "reference beam" 8. Both the object beam 7 and the reference beam 8 are focused into a holographic storage medium 10, e.g. a holographic disk, by an objective lens 9. At the intersection of the object beam 7 and the reference beam 8 an interference pattern appears, which is recorded in a photo-sensitive layer of the holographic storage medium 10. In the described setup the reference beam 8 is reflected by the SLM 6. Of course, it is likewise possible to provide an independent optical path for the reference beam 8.

The stored data are retrieved from the holographic storage medium 10 by illuminating a recorded hologram with the reference beam 8 only. The reference beam 8 is diffracted by the hologram structure and produces a copy of the original object beam 7, the reconstructed object beam 11. This reconstructed object beam 11 is collimated by the objective lens 9 and directed onto a 2-dimensional array detector 13, e.g. a CCD-array, by a second beam splitter 12. The array detector 13 allows to reconstruct the recorded data.

For pre-exposure and/or curing an additional light beam 15 is emitted by a source 14 of incoherent light, e.g. a light emitting diode (LED), and is coupled into the optical path by a further lens 16 and a further beam splitter 17 and illuminated onto the holographic storage medium 10.

In FIG. 2 an apparatus 1 according to the invention for reading from and writing to holographic storage media is shown. The optical setup is essentially the same as in FIG. 1. However, in this setup the reflective SLM 6 of FIG. 1 is replaced by a special digital mirror device 60, i.e. an array of switchable micro mirrors 61. The digital mirror device 60 on the one hand modulates the object beam 7 and reflects the reference beam 8. On the other hand, it is also used for directing the pre-exposure or curing light beam 15 emitted by the light source 14 towards the holographic storage medium 10. In this way the further beam splitter 17 of FIG. 1 can be omitted. Again, it is likewise possible to provide an independent optical path for the reference beam 8.

Figure 4:
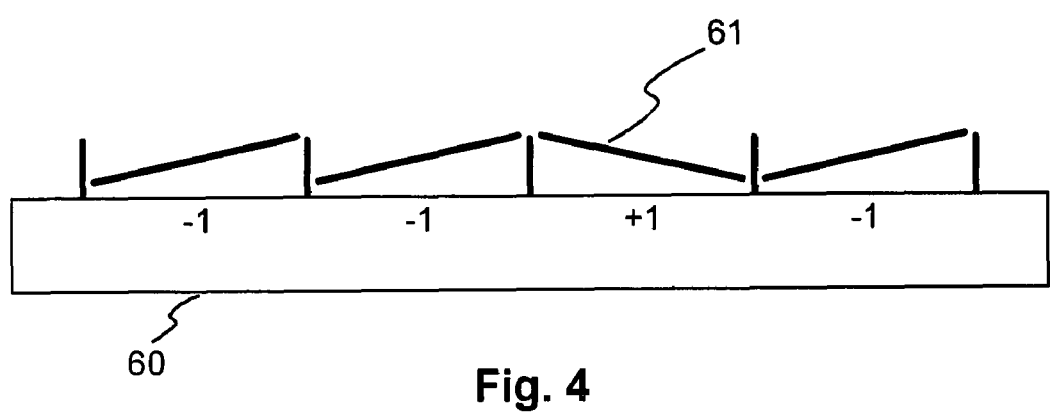
FIG. 4 shows a side view of the digital mirror device of FIG. 3.

A top view of the digital mirror device 60 is depicted in FIG. 3. A side view is shown in FIG. 4. The digital mirror device 60 consists of an array of switchable micro mirrors 61. It is used both as a spatial light modulator for the coherent light beams 7, 8 and as a steering mirror for the incoherent light beam 15. For this purpose the micro mirrors 61 are switchable between two states, where each state corresponds to a different tilt angle of a single micro mirror 61. In the following those states will be called state −1 and +1. When the digital mirror device 60 is illuminated by the light beams 7, 8 of the coherent light source 2, the micro mirrors 61 which are in state −1 generate bright pixels in the main optical path. The micro mirrors 61 which are in +1 state reflect the light into a direction away from the main optical path. Thus they generate dark pixels in the optical path. In this way the object beam 7 is spatially modulated. As generally no spatial modulation is desired for the reference beam 8, all micro mirrors 61 illuminated by the reference beam 8 are set into the −1 state.

For pre-exposure and curing the source 14 of incoherent light is switched on and the digital mirror device 60 is illuminated by the incoherent light beam 15. The micro mirrors 61 are switched into the +1 state and steer the incoherent light beam 15 towards the holographic storage medium 10. Advantageously all micro mirrors 61 are switched into the +1 state to achieve a maximum intensity and a homogeneous intensity distribution in the main optical path.

In the figures the invention is explained with reference to an apparatus for reading from and writing to holographic storage media. Of course, the invention can also be used in an apparatus for only writing to holographic storage media. In addition, the general idea of the invention is likewise applicable to other optical systems where a switching between two ore more different light sources is necessary. The light sources do not need to be one source of coherent light and one source incoherent light. For example, the light sources can also be three lasers emitting red, green and blue light, respectively, to generate a color picture. In this case the digital mirror device 60 would need three states, i.e. three controllable tilt angles of the micro mirrors 61.

What is claimed is:

1. An apparatus for writing to an optical storage medium, with a first light source for emitting a first light beam, a second light source for emitting an incoherent light beam, and a spatial light modulator, which is a digital mirror device having a plurality of switchable micro mirrors, wherein the micro mirrors are switchable between at least two states for modulating at least a part of the first light beam, wherein in a first state the switchable micro mirrors are adapted to direct the first light beam towards an optical storage medium, and wherein in a second state the switchable micro mirrors are adapted to direct the incoherent light beam towards the optical storage medium for pre-exposure and/or curing of the optical storage medium.

2. The apparatus according to claim 1, wherein the optical storage medium is a holographic storage medium.

3. The apparatus according to claim 2, wherein the first light beam is a coherent light beam for writing to the holographic storage medium.

4. A method for pre-exposure and or curing of an optical storage medium, the method comprising the steps of:
switching a plurality of micro mirrors of a digital mirror device serving as a spatial light modulator, which in a first state modulate at least a part of a first light beam emitted by a first light source, into a second state,
switching on a second light source for emitting an incoherent light beam, and directing the incoherent light beam with the micro mirrors of the digital mirror device towards the optical storage medium for pre-exposure and/or curing of the optical storage medium.

5. The method according to claim 4, wherein the optical storage medium is a holographic storage medium.

6. The method according to claim 5, wherein the first light beam is a coherent light beam for writing to the holographic storage medium.

7. The method according to claim 4, further comprising the step of generating a desired exposure dose profile by selectively switching only some micro mirrors of the digital mirror device into the second state and/or by individually adapting the time during which the micro mirrors of the digital mirror device remain in the second state.

\* \* \* \* \*